No. 851,802. PATENTED APR. 30, 1907.
C. E. CURTISS.
PULLEY ATTACHMENT.
APPLICATION FILED FEB. 19, 1906.

Witnesses
Lou Cilley
Cecil C. Cilley

Inventor
Clarence E. Curtiss,
By Detrick J. Cilley
Attorney

UNITED STATES PATENT OFFICE.

CLARENCE E. CURTISS, OF GRAND RAPIDS, MICHIGAN.

PULLEY ATTACHMENT.

No. 851,802.   Specification of Letters Patent.   Patented April 30, 1907.

Application filed February 19, 1906. Serial No. 301,925.

*To all whom it may concern:*

Be it known that I, CLARENCE E. CURTISS, a citizen of the United States, residing at Grand Rapids, in the county of Kent and State of Michigan, have invented certain new and useful Improvements in Pulley Attachments, of which the following is a specification.

Figure 1:
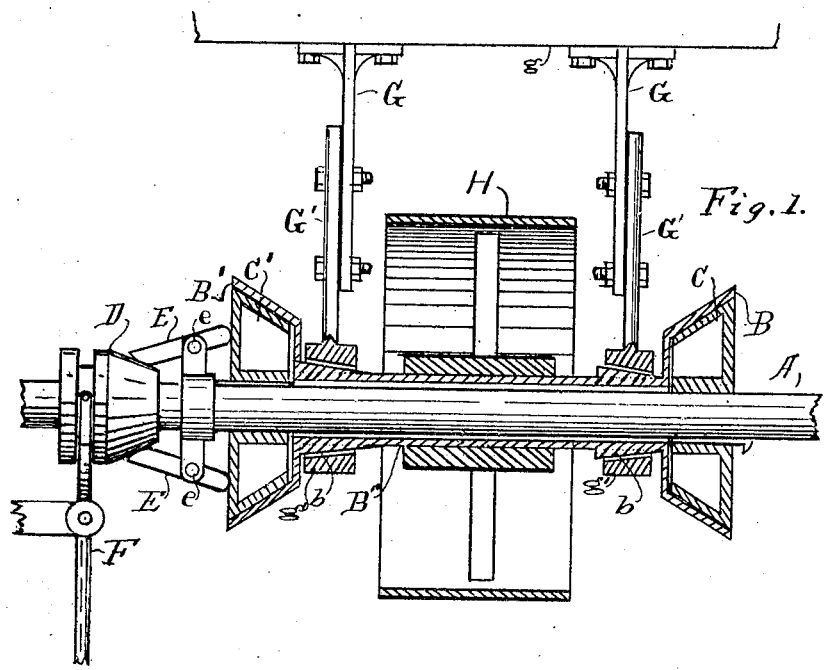
Figure 2:
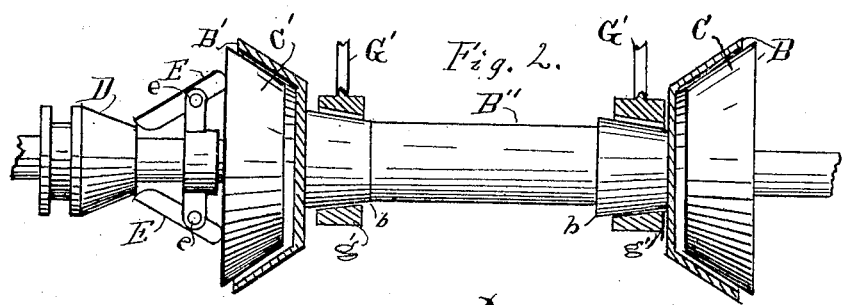
Figure 3:
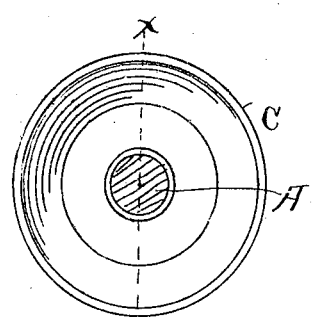

My invention relates to improvements in appliances for attaching pulleys to shafts, and its objects are: first, to provide an appliance whereby the pulley may be readily converted from an idle, to a driving pulley, and, second, to provide a means whereby the pulley will be supported independent of the shaft, when idle. I attain these objects by the mechanism illustrated in the accompanying drawing in which Figure 1 is a sectional elevation of the pulley support on the line $xx$ of Fig. 3; Fig. 2 is the same with only the outer section of the friction shell shown in section on the line $xx$ of Fig. 3, and Fig. 3 is an end view of the outer shell of the friction with the shaft shown in section.

Similar letters refer to similar parts throughout the several views.

To carry out my invention, I mount a hollow shaft $B''$ upon the main shaft A. This hollow shaft has a cup B at one end and a cup $B'$ at the other end, both of said cups being integral with the hollow shaft $B''$. The hollow shaft $B''$ is so supported by the hangers $G G'$ that it will not come in contact with the revolving shaft A but is made to revolve therewith when the friction clutch members B—C and $B'$—$C'$ are engaged, as follows: The friction cone C is securely fastened to the shaft A near the cup B, at one end of the shaft $B''$, and the friction cone $C'$ is slidably mounted upon the shaft A near the cup $B'$ at the other end of the shaft $B''$ and the cone D is slidably mounted upon shaft A in position so that it may be actuated by the lever F to throw it either direction longitudinal of the shaft A so that when it is moved toward the hollow shaft $B''$ one end of the arms E,— these arms being pivotally secured to arms on the shaft A as at $e$ $e$,—will be spread apart and the other ends of these arms will be pressed against the surface of the friction cone $C'$ and force this cone into the cup $B'$. This action will force the shaft $B''$ endwise so that the cup B will engage the cone C and cause the shaft $B''$ to revolve with the shaft A, and, the pulley H being securely attached to the hollow shaft $B''$ is made to revolve therewith, while if the cone D is moved away from the shaft $B''$ it will release the cones C $C'$ from the cups B $B'$ and allow the shaft $B''$ to rest upon the hangers $G'$ so that the shaft A will revolve freely without coming in contact with the shaft $B''$.

The inclines $b$ $b$ and $g'$ $g'$ are so formed that when the cone $C'$ is removed from the cup $B'$ the shaft $B''$ will slide endwise and disengage the cup B from the cone C.

The hangers G are secured to the beam $g$ and the portions $G'$ thereof are so bolted to the said hangers G that they may be adjusted endwise to lengthen or shorten the hangers to correspond with the position the shaft A is to be placed in.

Having thus fully described my invention what I claim as new and desire to secure by Letters Patent of the United States is:

1. In combination with a driving shaft and a pulley, a stationary friction cone on the shaft, and a friction cone longitudinally adjustable upon the shaft, a pair of friction cups connected by an annular body and thereby secured to the pulley, adjustable hangers for supporting the body of the friction cups, an inclined bearing between each of the hangers and the body, and a toggle for actuating the friction clutches, substantially as and for the purpose set forth.

2. In combination with a driving shaft and a pulley, a stationary and an adjustable friction cone secured to the shaft and a toggle for actuating the adjustable cone, friction cups connected by an annular body having a central longitudinal aperture of larger diameter than the shaft, adjustable hangers to support the friction cups and body, and a tapering bearing between each hanger and the body, substantially as shown and described.

Signed at Grand Rapids, Michigan, February 14, 1906.

CLARENCE E. CURTISS.

In presence of:
E. O. BUDMAN,
I. J. CILLEY.